(12) United States Patent
Kato et al.

(10) Patent No.: US 7,090,412 B2
(45) Date of Patent: Aug. 15, 2006

(54) OPTICAL MODULE

(75) Inventors: Kiyoshi Kato, Yokohama (JP); Toshio Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 43 days.

(21) Appl. No.: 10/631,961

(22) Filed: Aug. 1, 2003

(65) Prior Publication Data
US 2004/0076384 A1    Apr. 22, 2004

(30) Foreign Application Priority Data
Aug. 2, 2002    (JP)    ............... P2002-226364

(51) Int. Cl.
G02B 6/36    (2006.01)
(52) U.S. Cl. ............... 385/93; 385/88; 385/92; 385/94
(58) Field of Classification Search ............ 385/14–15, 385/31, 33, 52, 88–94
See application file for complete search history.

(56) References Cited

U.S. PATENT DOCUMENTS

| | | | | |
|---|---|---|---|---|
| 4,204,743 A | * | 5/1980 | Etaix | 385/88 |
| 4,553,813 A | * | 11/1985 | McNaughton et al. | 385/89 |
| 4,762,389 A | * | 8/1988 | Kaihara | 385/60 |
| 5,132,532 A | * | 7/1992 | Watanabe | 250/239 |
| 5,216,737 A | * | 6/1993 | Driessen et al. | 385/93 |
| 5,386,488 A | * | 1/1995 | Oikawa | 385/92 |
| 5,546,490 A | * | 8/1996 | Kikuchi et al. | 385/93 |
| 5,661,835 A | * | 8/1997 | Kato et al. | 385/92 |
| 5,675,685 A | * | 10/1997 | Fukuda et al. | 385/89 |
| 5,751,877 A | * | 5/1998 | Ishizaka et al. | 385/93 |
| 5,845,031 A | * | 12/1998 | Aoki | 385/92 |
| 5,924,290 A | * | 7/1999 | Yoshino | 62/3.7 |
| 5,960,142 A | * | 9/1999 | Shimizu | 385/92 |
| 6,071,016 A | * | 6/2000 | Ichino et al. | 385/92 |
| 6,126,325 A | * | 10/2000 | Yamane et al. | 385/92 |
| 6,135,644 A | * | 10/2000 | Hakogi et al. | 385/92 |
| 6,163,072 A | * | 12/2000 | Tatoh | 257/704 |
| 6,220,765 B1 | * | 4/2001 | Tatoh | 385/94 |
| 6,244,754 B1 | * | 6/2001 | Takagi et al. | 385/88 |
| 6,572,279 B1 | * | 6/2003 | Takagi | 385/92 |
| 6,632,023 B1 | * | 10/2003 | Ogawa et al. | 385/53 |

(Continued)

FOREIGN PATENT DOCUMENTS

| | | |
|---|---|---|
| EP | 1 329 753 | 7/2003 |
| JP | 8-334654 | 12/1996 |
| JP | 10-332988 | 12/1998 |
| JP | 11-248974 | 9/1999 |
| JP | 11-258467 | 9/1999 |
| JP | 2001-66468 | 3/2001 |

*Primary Examiner*—Frank G. Font
*Assistant Examiner*—Ryan Lepisto
(74) *Attorney, Agent, or Firm*—Smith, Gambrell & Russell, LLP

(57) ABSTRACT

An optical module 1 includes an optical component 30, a body 10 incorporating an optical element 14, and a metallic sleeve 40 having a tubular shape. The optical component 30 includes a nonmetallic ferrule 32 having an optical fiber insertion hole 36, and a metallic holder 34 which covers part of the ferrule 32. In this optical module 1, part of the holder 34 is inserted into the sleeve 40, and is positioned and welded to the sleeve 40. The sleeve 40 is positioned to a tubular portion 29 of the body 10 and welded thereto.

7 Claims, 16 Drawing Sheets

U.S. PATENT DOCUMENTS

| | | | |
|---|---|---|---|
| 6,646,291 B1 * | 11/2003 | Takagi | 257/99 |
| 6,769,819 B1 * | 8/2004 | Tanaka et al. | 385/92 |
| 6,786,627 B1 * | 9/2004 | Takagi et al. | 362/555 |
| 6,805,494 B1 * | 10/2004 | Miki et al. | 385/88 |
| 6,836,490 B1 * | 12/2004 | Shinkai et al. | 372/36 |
| 2002/0085596 A1 * | 7/2002 | Irie et al. | 372/36 |
| 2002/0114593 A1 * | 8/2002 | Terada et al. | 385/93 |
| 2004/0105239 A1 * | 6/2004 | Chiang | 361/728 |

* cited by examiner

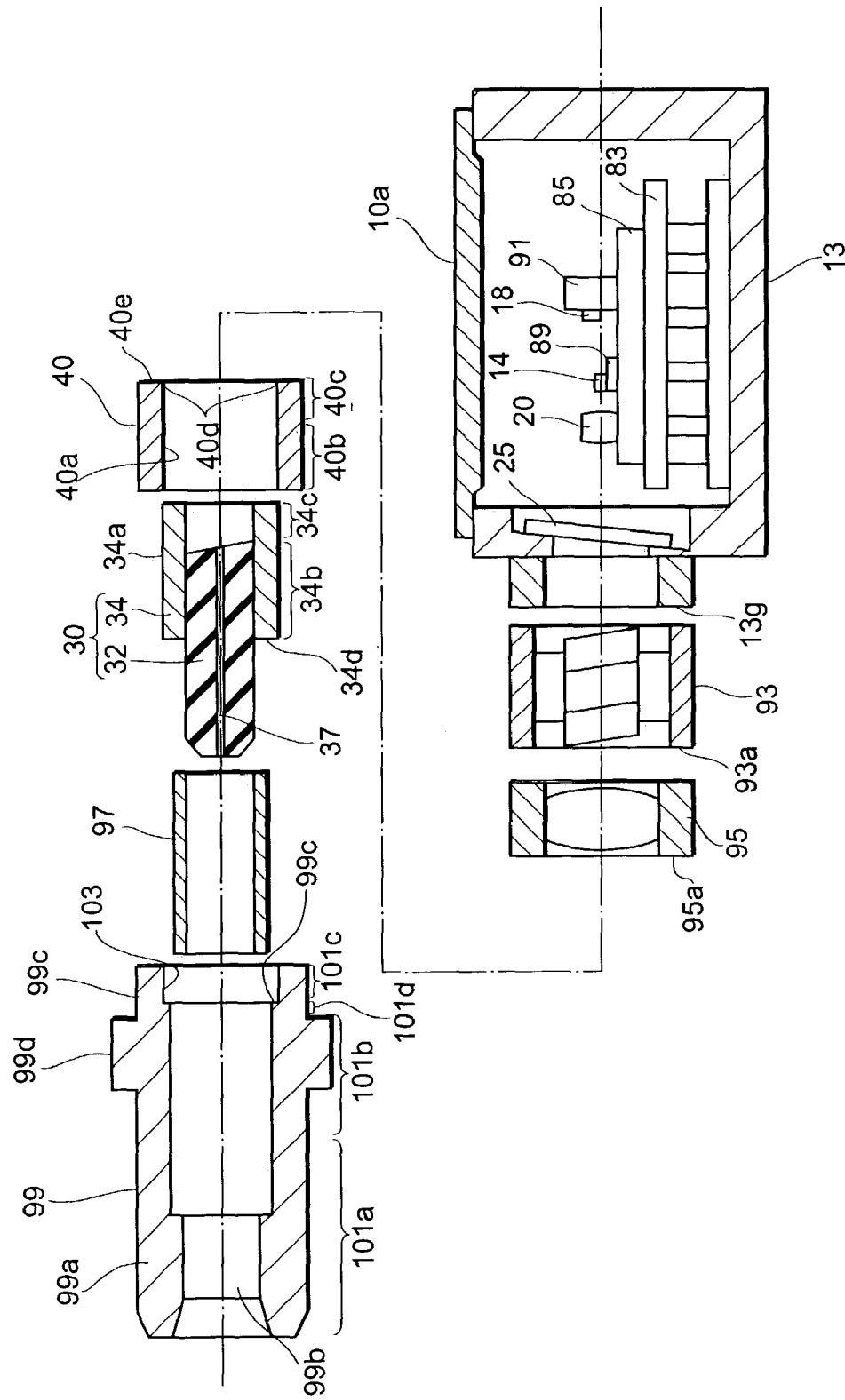

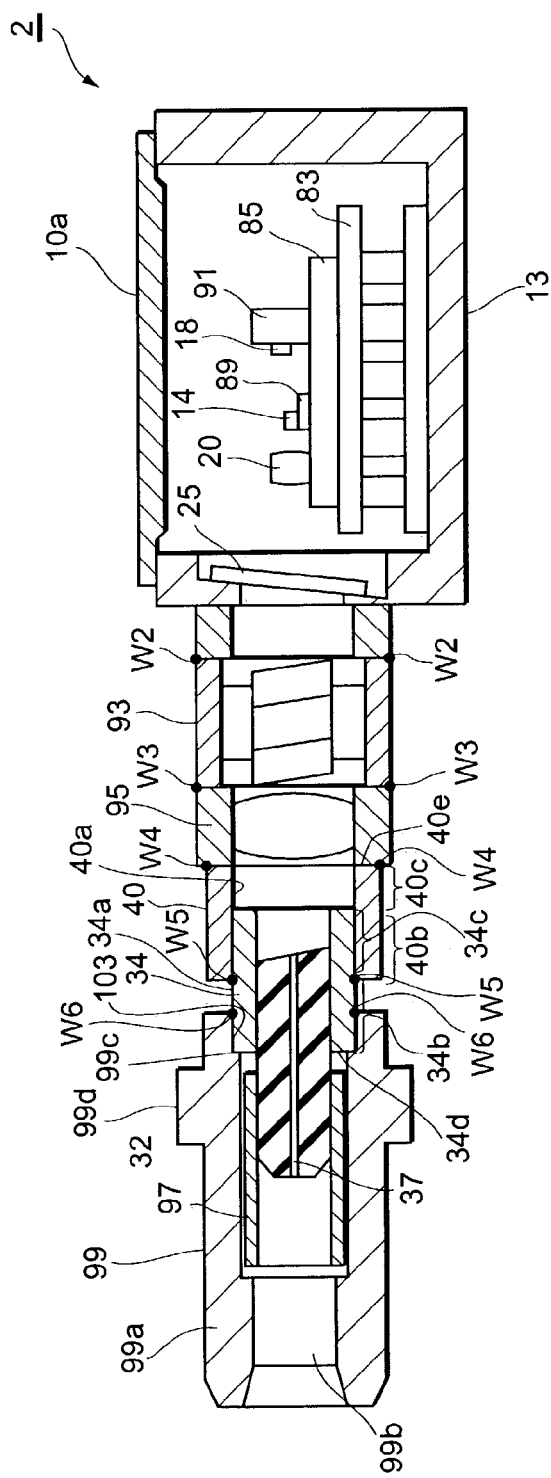
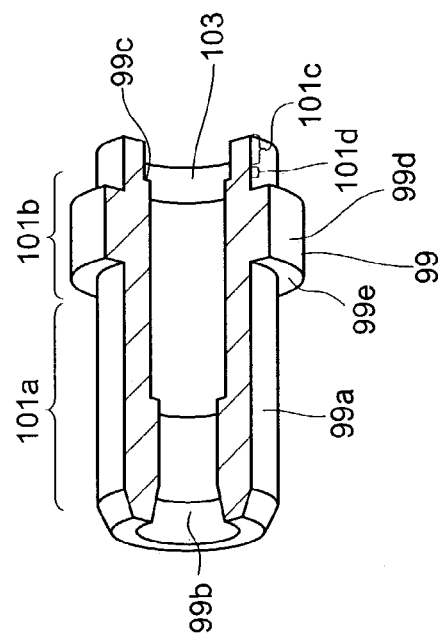
Fig.11A
Fig.11B

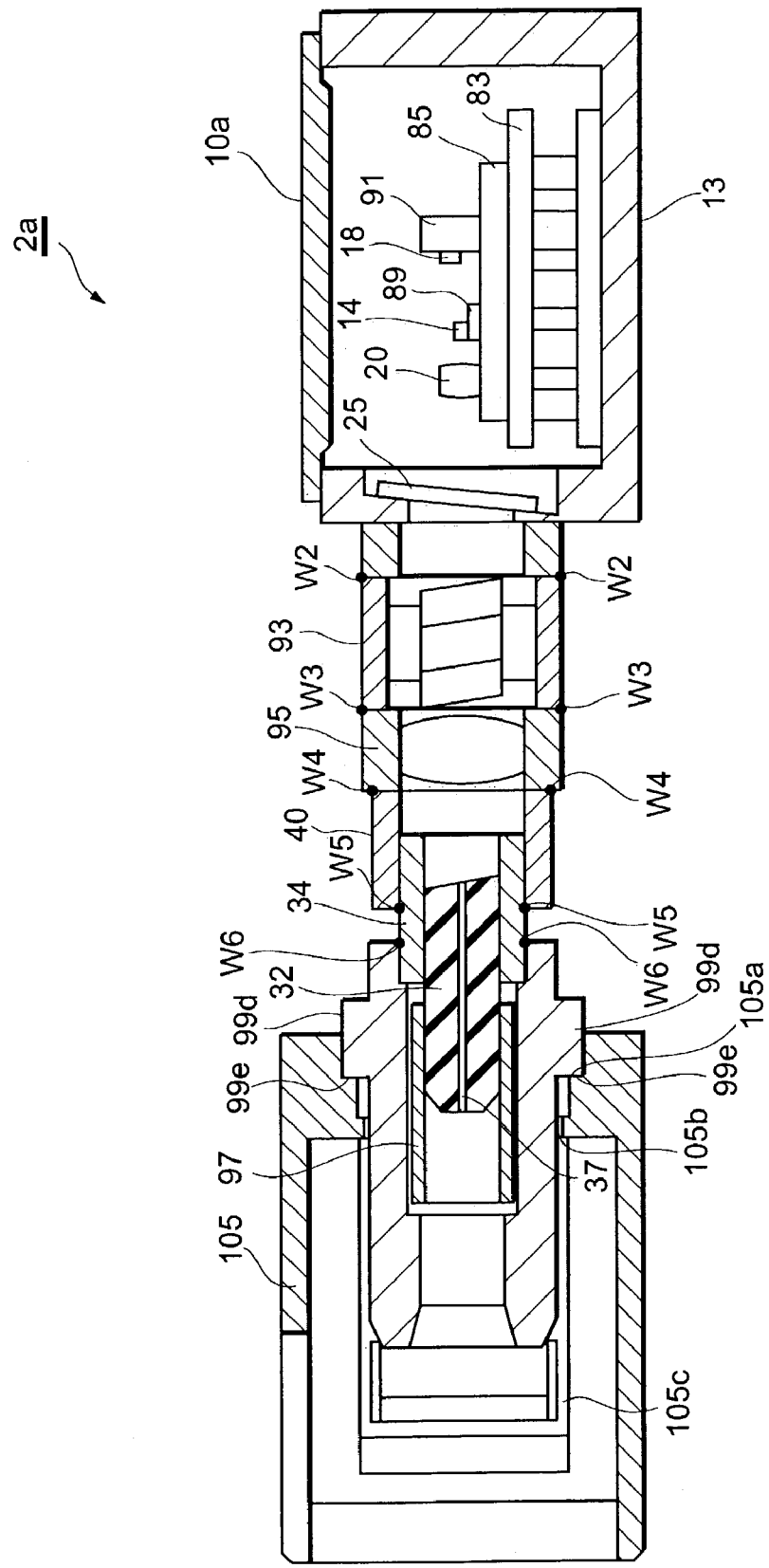

OPTICAL MODULE

BACKGROUND OF THE INVENTION

1. Field of the Invention

The present invention relates to an optical module.

2. Related Background of the Invention

Reference 1 describes an optical module. In this optical module, an optical fiber is mounted on a silicon bench via a nonmetallic ferrule by the passive alignment and is thereby aligned to a laser element (Japanese Laid Open No. H11-258467, for example).

Reference 2 describes an optical module using a resin-molded connector (Japanese Laid Open No. H11-248974, for example).

SUMMARY OF THE INVENTION

When an optical fiber is aligned with a semiconductor optical element by the passive alignment to form an optical module, the position of the optical fiber cannot be fine-tuned such that the optical module generates a predetermined optical output power.

It is an object of the present invention to provide an optical module which can facilitate the optical alignment.

According to one aspect of the present invention, the optical module comprises (a) a body including an optical element, (b) an optical component including a nonmetallic ferrule and a metallic holder for securing a part of the ferrule; and (c) a sleeve positioned to the body. The sleeve secures a part of the holder to position the holder relative to the body.

This optical component comprises the holder for securing the nonmetallic ferrule. Since this holder is made of meal, the positioning of the ferrule can be performed through the welding of the holder. It is preferable that the holder has a tubular shape. The ferrule preferably has a first portion having a first diameter and a second portion having a second diameter smaller than the first diameter. The holder secures the second portion of the ferrule. Accordingly, the ferrule is positioned to the holder with a high accuracy. It is preferable that the ferrule is made of zirconia. Since zirconia suitable for processing, the zirconia ferrule has excellent dimensional accuracy.

It is preferable that the optical module of the present invention includes a package having a first base made of metal and a second base made of ceramics, and the optical components, such as a light-emitting device, are installed on the first base. Accordingly, heat generated by the light-emitting device is dissipated through the first base made of metal.

The optical module of the present invention preferably includes an optical isolator provided between the ferrule and the optical component. The optical isolator enables to prevent light reflected by the optical fiber from returning back to the optical component, such as the light-emitting device, whereby the module operates stably.

The optical module of the present invention may further comprise a guide. The guide includes: a first end having a face for abutting the holder, a second end opposing to the first end, and a hole extending from the first end to the second end for receiving the ferrule therein. The holder abuts on the face of the first end of the guide to align the guide with the optical component. The guide may a first portion having the first end and a second portion having the second end. The first portion receives the ferrule inserted from the first end of the guide and the second portion receives a ferrule of an optical connector to be connected to the optical module. The present optical module has not a pig-tailed structure but a receptacle structure.

The optical module of the present invention may include a third member and a step in the guide. The third portion is in conjunction with the first portion at a side opposite to the second portion. The step locates between the first portion of the guide and the third portion of the guide. The third portion secures the holder. The face for abutting the holder is provided at the step. Since the holder abuts against the face of the guide, the portion of the guide relative to the holder is decided automatically.

The sleeve may include a first portion having a first end for providing on the body of the optical module and a second portion. The holder may include a first portion located in the second portion of the sleeve and a second portion having a second end for abutting the face of the guide. The optical alignment is performed on the body by the first end of the sleeve. After the alignment, the optical element in the body is optically coupled with the optical component.

The optical module may further comprise a connector guide. The connector guide may include a pair of side walls, a projections provided on each side walls and a front wall having a hole for inserting the ferrule thereinto. The ferrule is inserted to the hole of the front wall such that the holder abuts on an inner surface of the front wall.

Since the optical module of the present invention has the connector guide thus described, the module can be connected with an external connector. Furthermore, since the holder abuts on the inner surface of the front wall of the connector guide, the position of the connector guide to the optical component can be easily determined.

BRIEF DESCRIPTION OF THE DRAWINGS

The teaching of the present invention can be easily understood by considering the following detailed description taken in conjunction with the accompanying drawings shown as examples.

FIG. 10 is a view showing components of an optical module according to a second embodiment of the present invention;

FIG. 11A is a view showing the optical module of the second embodiment, and FIG. 11B is a view showing a guide member included in the optical module of the second embodiment;

FIG. 12 is a view showing a modified example of the optical module of the second embodiment;

DESCRIPTION OF THE PREFERRED EMBODIMENTS

Preferred embodiments of the present invention will be described with reference to the accompanying drawings. The use of the same symbols in different drawings indicates similar or identical items.

First Embodiment

Figure 1A:
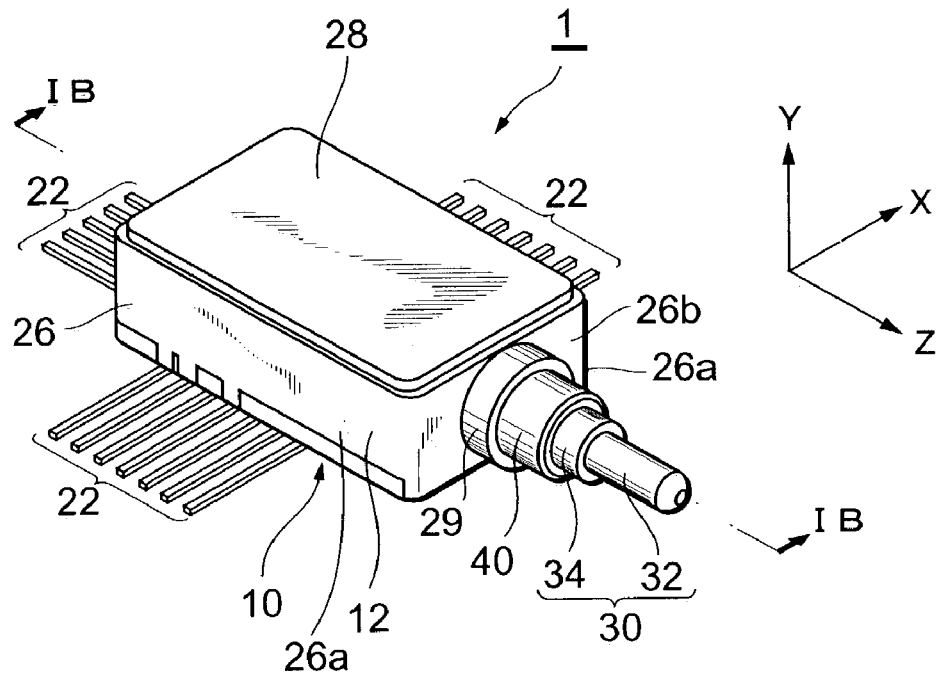
FIG. 1A is a perspective view showing an optical module according to a first embodiment of the present invention.
Figure 1B:
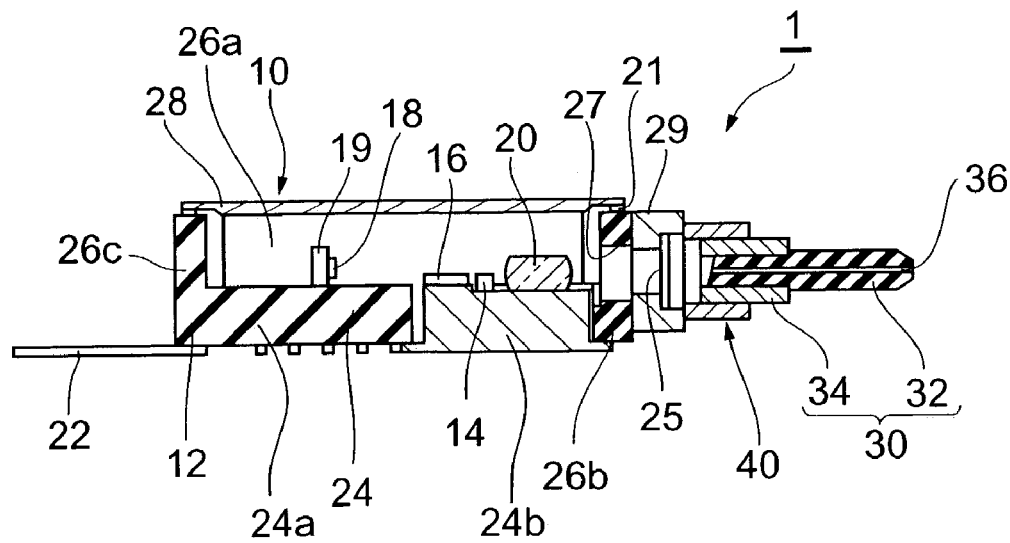
FIG. 1B is a cross sectional view, taken along the line IB—IB in FIG. 1A, showing an optical module (in which an optical connector guide is not illustrated)

FIG. 1A is a perspective view showing an optical module according to the first embodiment. FIG. 1B is a cross sectional view, taken along the line IB—IB in FIG. 1A.

Referring to FIGS. 1A and 1B, an optical module 1 includes a body 10, an optical component 30, and a sleeve 40. The body 10 includes a package 12, a semiconductor device such as a laser diode, a laser driver 16, a laser light monitoring device 18 such as photo diode, a lens 20, and a plurality of lead terminals 22.

The package 12 includes a bottom portion 24, a wall portion 26, and a rid 28. The bottom portion includes a first portion 24a made of metal and a second portion that may be made of alumina ceramic and integrally formed with the wall portion 26. The first portion 24a works as a mounting member for mounting a plurality of elements, such as laser diode 14, the laser driver 16, and the lens 20 which the second portion mounts the photo diode 18 therein. These elements are mounted on the first portion 24a and the second portion 24b in alignment with a predetermined axis (Z axis shown in FIG. 1A). Since the laser diode 14 is mounted on the first portion 24a made of a metal, the heat generated by the laser diode and the laser driver can easily dissipate to the outside of the module. Moreover, since the second portion made of ceramic provides the lead terminals and wirings from the respective terminals to the laser driver, the module can stably operate at high performance.

The wall portion 26 may be made of alumina ceramic. This wall portion 26 includes a pair of side walls 26a, a front wall 26b and a rear wall 26c. The side walls 26a extend along the predetermined axis (Z axis shown in FIG. 1A). The front wall 26b and the rear wall 26c intersect with this predetermined axis. A through hole 27 is provided in the front wall 26b. Light from the laser diode 14 passes through the through hole 27. A tubular portion 29 is provided on an outer face of the front wall 26b and is used for mounting a sleeve 40 thereon, as described below. The tubular portion 29 has a first portion and a second portion. The first portion has a larger inside diameter, and the second portion has a smaller inside diameter. A hermetic window 25 is provided in the first portion so as to seal the package 12 therewith. This tubular portion 29 is made of metal, such as Kovar (trademark), to permits the welding of the sleeve 40 to the tubular portion 29, and the tubular portion 29 may be provided coaxially with the through hole 27.

The rid 28 may be made of metal, such as Kovar. This rid 28 covers an upper opening of the wall portion 26.

In this body 10, the hermetic window 25 is installed in the tubular portion 29, and the rid 28 is hermetically sealed to the wall portion 26 of the package 12 via a seal ring 21. Accordingly, the package 12 is hermetically sealed to form a cavity. The hermetically sealed cavity can maintain high reliability of the laser diode 14 incorporated in the body 10 over a long period.

The laser diode 14 is mounted on an upper surface of the first portion 24. This laser diode 14 emits light modulated in response to a modulating signal provided by the laser driver 16.

The laser driver 16 is mounted on the first portion 24a and is located between the rear wall 26c and the laser 14. The laser driver 16 and the laser diode 14 are in spaced side-by-side relation to each other. The laser driver 16 receives the driving signal inputted via the lead terminals 22. The driving signal modulates the laser driver.

The photo diode 18 is mounted on a side surface of a mounting member 19 provided on the second portion 24b. To be more precise, the mounting member 19 is mounted on the second portion 24, which is located between the rear wall portion 26c and the laser driver 16. The photo diode 18 can receive light from the back facet of the laser diode 14.

The lens 20 is mounted on the first portion 24. Namely, the lens 20 is mounted on the first portion 24a and is located between the front wall 26b and the laser diode 14. The lens 20 receives light from a front facet of the laser diode 14. The lens 20 may be formed from a ball lens by cutting the upper and lower portions of the ball to form upper and lower planes. Since the lower face is made flat, the lens 20 can be mounted on the first portion 24a with a superior accuracy.

The lead terminals 22 extend outward from both edges of the bottom face of the package 12. The optical module 1 can receive signals from the outside through the plurality of lead terminals 22 and can supply signals to the outside therethrough.

As shown in FIG. 1A to FIG. 2B, the optical component 30 includes a ferrule 32 and a holder 34. The ferrule 32 is made of ceramic, such as zirconia.

Since zirconia is suitable for processing, the ferrule 32 made of zirconia has excellent dimensional accuracy. The ferrule 32 includes a first portion 32b having a given outside diameter, and a second portion 32a having a diameter smaller than the first ferrule portion 32b. A step 32c is provided between the second portion 32a and the ferrule portion 32b. A hole 36 passes from the second ferrule portion 32a to the first ferrule portion 32b, and an optical fiber 37 is inserted into this hole 36. In order to connect the optical module in ease to an external connector, an emitting end of the ferrule 32 is chamfered.

The holder 34 is made of metal, such as stainless steel. This holder 34 has a tubular shape, and the second portion 32a is pressed into the holder 34. Since the step 32c of the ferrule 32 abuts on the holder 34, the ferrule 32 can be precisely positioned to the holder 34.

Figure 2A:
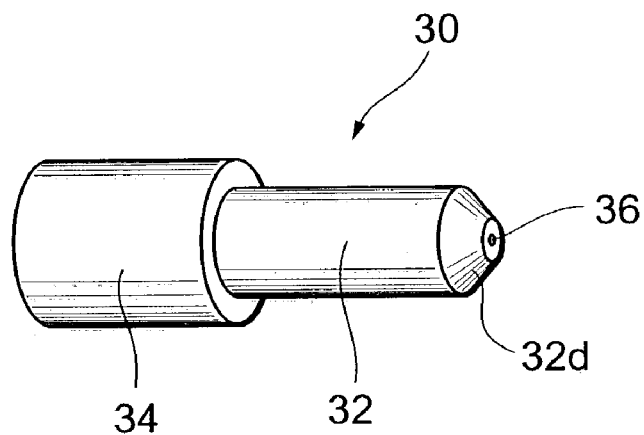
FIG. 2A is a view showing an optical component according to the first embodiment.
Figure 2B:
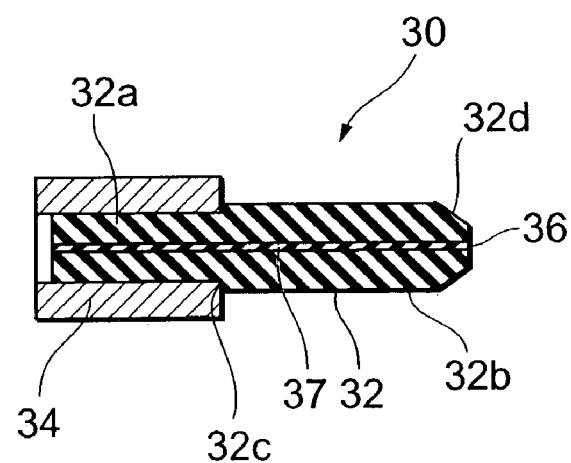
FIG. 2B is a cross sectional view showing the optical component.
Figure 3A:
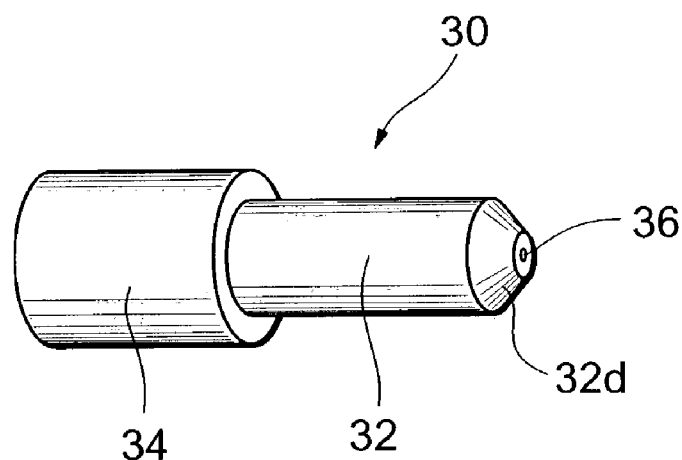
FIG. 3A is a view showing a modified example of the optical component.
Figure 3B:
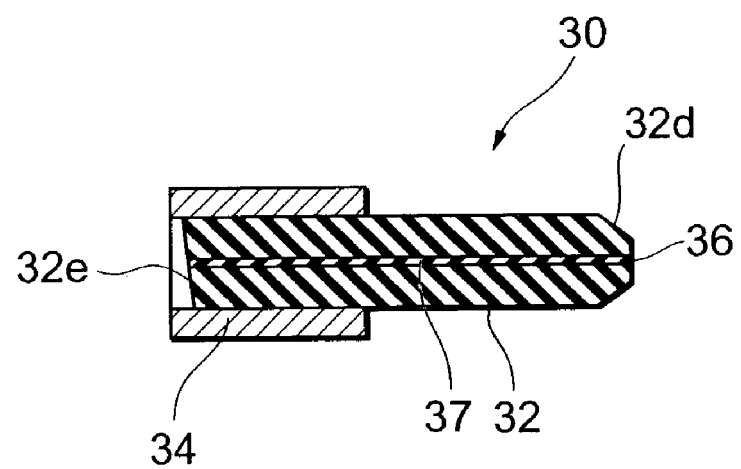
FIG. 3B is a cross sectional view showing the modified example of the optical component.

The configuration of the ferrule 32 is not limited to one example shown in FIGS. 2A and 2B. Alternatively, the ferrule 32 may be formed into a shape with a constant diameter as shown in FIG. 3B. The end facet 32e of the ferrule 32 may be formed obliquely.

Although the ferrule 32 is made of nonmetallic material as described above, the ferrule 32 can be secured to the metallic sleeve 40 by laser welding using the metallic holder 34 that one end of the ferrule 32 is pressed into and covered with as shown in FIG. 2A to FIG. 3B.

The sleeve 40 is made of metal, such as stainless steel, and has a tubular shape. The holder 34 is inserted into the sleeve 40, and the optical component 30 is positioned to the sleeve 40 and is secured to the sleeve 40 by laser welding. Moreover, this sleeve 40 is positioned to the tubular portion 29 provided on the front wall 26b and is secured to the outer surface of front wall 26b by laser welding. The optical component 30 is aligned with the body 10 on the tubular portion 29 via the sleeve 40. In this way, the optical fiber is optically coupled via the optical component 30 and sleeve 40 with the laser diode 14 incorporated into the body 10.

Subsequently, description will be made on three-axis active alignment in which the optical component 30 is positioned to the body 10 in X, Y, and Z directions by use of the above-described parts.

Figure 4:
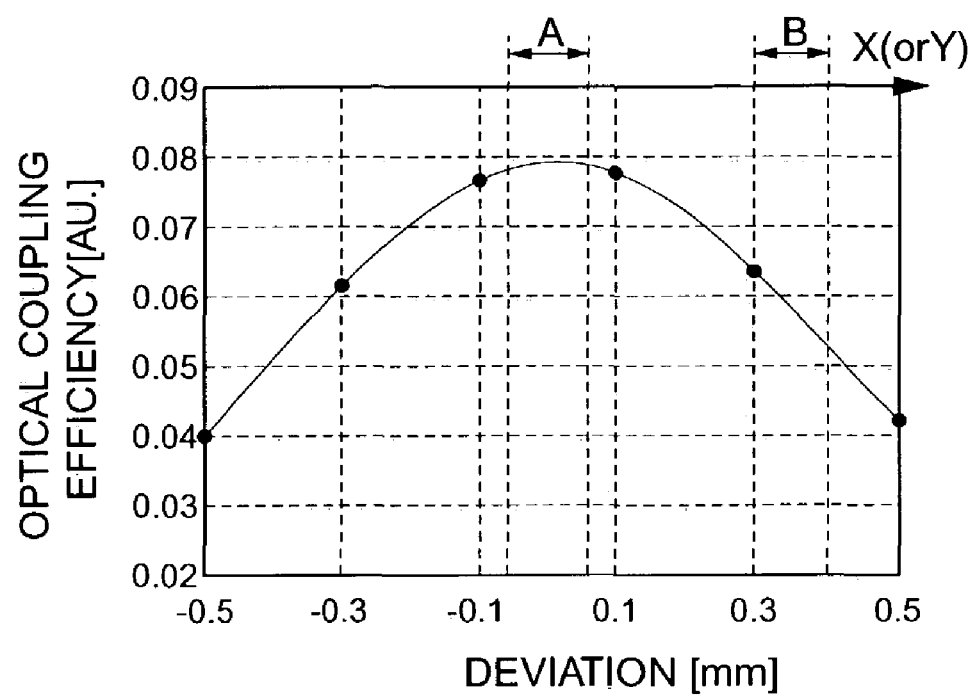
FIG. 4 is a graph showing the relation between the coupling efficiency of the optical module and the deviation in the X and Y directions.

First, preliminary alignment is performed in X, Y, and Z directions so as to obtain a given optical output power. The alignment of the Z direction is executed by sliding the holder 34 of the optical component 30 in the sleeve 40. The alignment of the X and the Y directions are executed by sliding the sleeve 40 on the surface of the tubular portion 29. After the completion of the alignment in the Z direction, the holder 34 of the optical component 30 is secured to the sleeve 40 by laser welding. Welding the holder 34 to the sleeve 40 may cause slight deviation in the X and the Y directions, and then the deviation is corrected in the subsequent alignment of the X and the Y directions. Thereafter, the sleeve 40 is secured to the tubular portion 29 by laser welding. Basically, the alignment in the X and the Y directions is executed so as to find the optimum position thereof. As shown in FIG. 4, the coupling efficiency exhibits small change in response to deviation in the X and the Y directions around the optimum position. Accordingly, the optical module obtains a stable coupling efficiency after the optimum position has been found in the optical alignment in the X and Y directions.

Figure 5A:
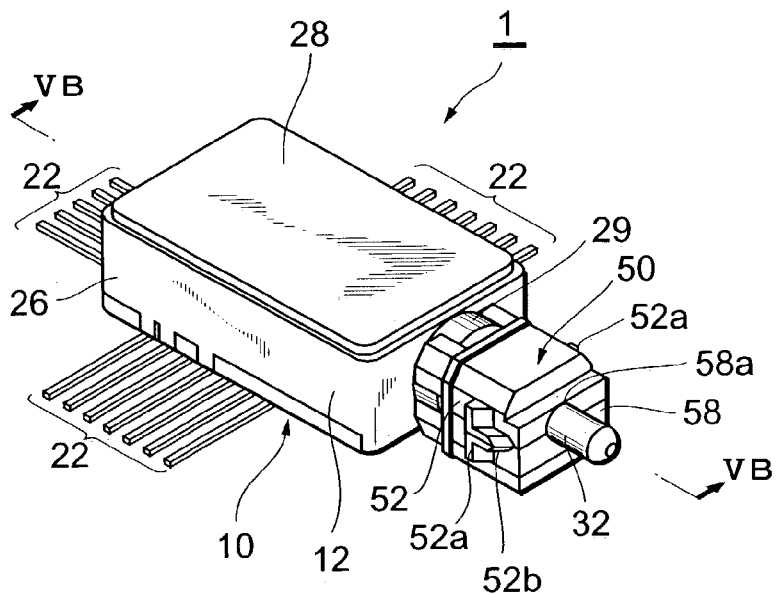
FIG. 5A is a perspective view showing an optical module according to another embodiment.
Figure 5B:
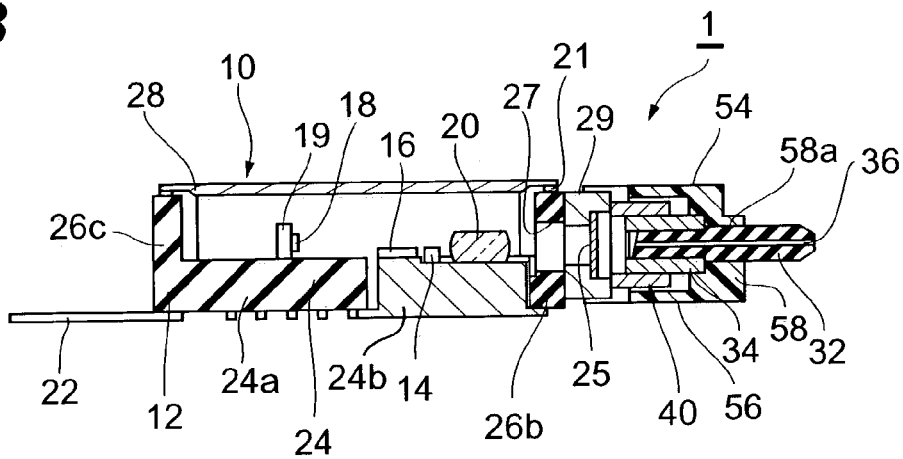
FIG. 5B is a cross sectional view taken along the VB—VB line in FIG. 5A (in both figures, a connector guide is mated with the optical module).
Figure 5C:
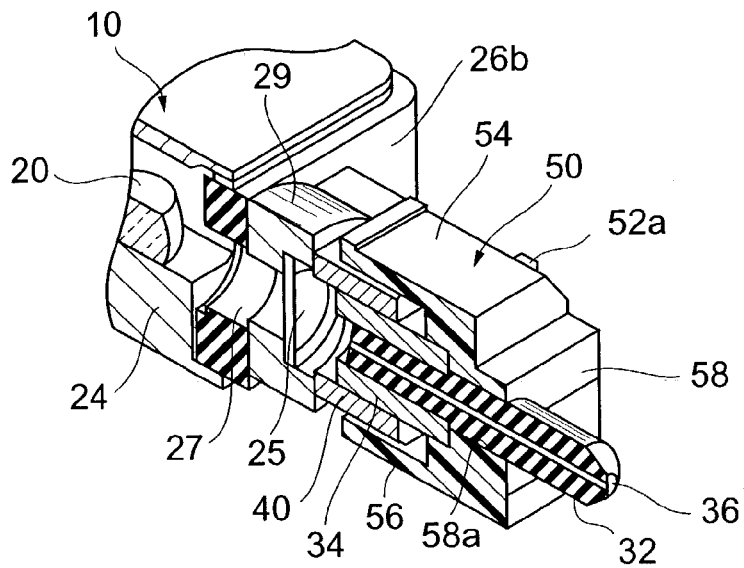
FIG. 5C is an enlarged perspective view showing the connector guide of FIG. 5B.

As shown in FIGS. 5A to 5C, the optical module 1 according to the present embodiment further includes a connector guide 50. FIG. 5A is a perspective view showing the optical module 1 with the connector guide 50 attached thereto. FIG. 5B is a cross sectional view, taken along the line VB—VB in FIG. 5A. FIG. 5C is an enlarged perspective view showing the vicinity of the connector guide 50 of FIG. 5B.

As shown in FIGS. 5A to 5C, the connector guide 50 has a pair of side surfaces 52, an upper surface 54, a lower surface 56, and a front surface 58. The front surface 58 is provided so as to intersect the Z axis. The connector guide 50 may be a box-shaped member the rear end of which is open.

The connector guide 50 has projections 52a provided on respective side surfaces 52. These projections 52a extend along the Y direction and are provided so as to engage with fingers 77 of the optical connector 70 (in FIG. 7). The projections function as backstops. The connector guide 50 has ribs 52b for guiding the optical connector 70. The ribs 52b are provided on the side surfaces 52, respectively, and extend along the Z direction. The rib 52b extends from the projection 52a to the vicinity of the front face 58. The edge of the rib 52b is tapered, so that the rib 52b can easily fit into a guide groove 78 (in FIG. 7) of the optical connector plug 70. The mating of the optical module 1 with the optical connector 70 will be described later. The front surface 58 has a hole 58a into which the ferrule 32 is inserted.

This connector guide 50 receives the holder 34 and the sleeve 40 therein with the ferrule 32 inserted into the hole 58a 58. The holder 34 abuts on an inner surface of the connector guide 50, so that the holder 34 is positioned to the front surface 58. As a result, the distance between the front end of the ferrule 32 and the projection 52a is determined as shown in FIGS. 5A to 5C, so that the distance determines repulsive force from a spring 75 (in FIG. 7) of the optical connector 70. Accordingly, it is possible to reduce unevenness of the optical coupling between the optical module and the optical connector.

Figure 6A:
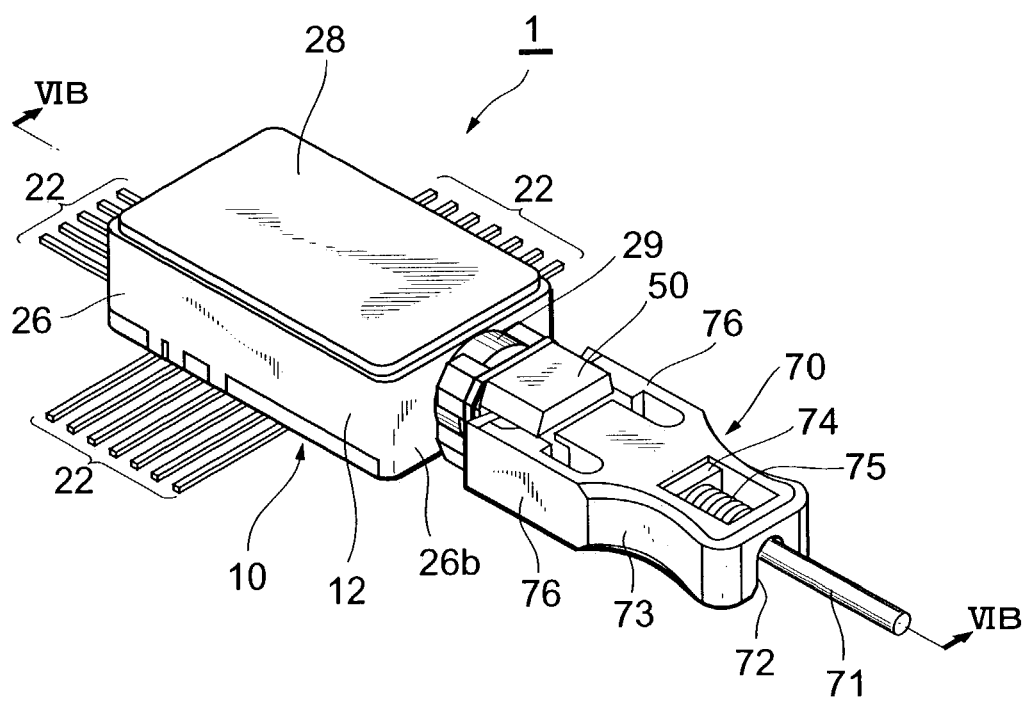
FIG. 6A is a perspective view showing the optical connector and the optical module according to the first embodiment with the optical connector connected to the optical module.
Figure 6B:
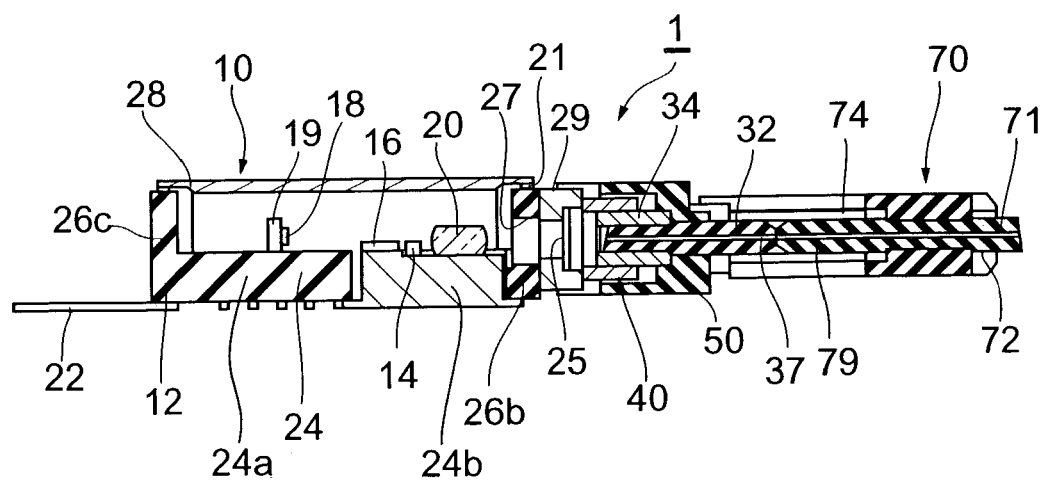
FIG. 6B is a cross sectional view, taken along the line VIB—VIB in FIG. 6A, showing the optical connector and the optical module.

As shown in FIGS. 6A and 6B, the optical module 1 of the present embodiment is coupled with the optical connector 70 via the connector guide 50. The optical connector 70 may be made of plastics.

Figure 7:
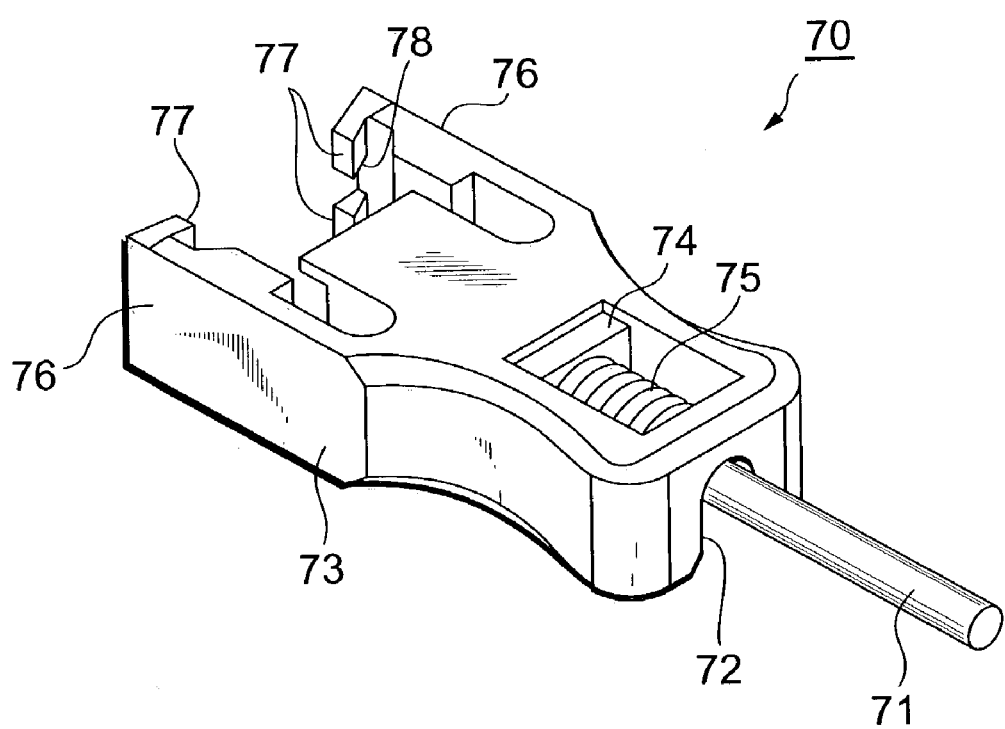
FIG. 7 is a perspective view showing an optical connector.

As shown in FIG. 6A to FIG. 7, the optical connector 70 includes an optical fiber 71, a connector housing 73 and a sleeve 74. One end of the optical fiber 71 is inserted into and fixed to a ferrule 79. The sleeve 74 positions the ferrule 79. The connector housing 73 has a rear wall having an opening 72 through which the optical fiber 71 passes. A helical spring 75 is located between the sleeve 74 and the rear wall of the connector housing 73, and the optical fiber 71 extends along the center of the helical spring 75.

The connector housing 73 includes a pair of elastic arms 76 to be mated with the connector guide 50. The arms 76 are located at both side of the connector housing 73. The arms 76 extend along Z direction of the optical axis. The fingers 77 can be engaged with the projections 52a of the guide 50, and are provided on inner surfaces of the arms portions 76. Each finger 77 has a tip tapered to facilitate to mate with the projection 52a. In association with the tapered tips, each projection 52a also has a tapered surface on which the finger 77 abuts. Accordingly, when the connector guide 50 is fitted into the optical connector 70, the projections 52a elastically deform the arms 76 outward to permit the engaging fingers 77 to mate with the projections 52a. The fingers 77 recover their original shape after mating with the projections 52a. This engagement prevents the optical connector 70 from coming off. In particular, since the helical spring 75 is located between the sleeve 74 and an inner wall of the opening 72, the optical connector 70 does not come off due to the helical spring 75 once the projections 52a and the fingers 77 are engaged with each other.

In addition, each finger 77 has the guide groove 78, and the guide groove 78 is shaped so as to correspond to the position and shape of the rib 52b of the connector guide 50. This guide groove 78 acts to guide the optical connector 70 when the optical connector 70 is mated with the optical module 1. Moreover, after the optical connector 70 is mated with the optical module 1, the guide groove 78 prevent the ferrule 32 from receiving unexpected force in the direction perpendicular to a plane along which the ferrule 32 and the ribs 52b are arranged.

As shown in FIGS. 6A and 6B, when the optical connector 70 is mated with the optical module 1, the ferrule 32 of the optical module 1 is housed in the sleeve 74 of the optical connector 70. Moreover, the ferrule 79 holds the optical fiber 71 and is inserted into the sleeve 74 and positioned via the sleeve 74.

As described above, according to the optical module 1 of the present embodiment, the holder 34 is slid along the Z direction relative to the sleeve 40 and positioned thereto, and then the holder 34 is welded to the sleeve 40. The sleeve 40 is slid in the X and the Y directions relative to the tubular portion 29, and then the sleeve 40 is welded to the tubular portion 29. This structure of the optical module allows the fine-tuning of the optical fiber in the three-axis directions. Accordingly, it is possible to execute the optical alignment that can generate a predetermined optical output power.

As described above, since the optical alignment is performed by the three-axis active alignment, it is not necessary to mount a laser device on a silicon bench, in which the optical alignment is performed by the passive alignment. Instead, the laser diode 14 is mounted on the bottom portion 24 which is made of metal.

Furthermore, in the conventional module using optical bench, since an optical fiber is aligned with a laser diode by passive alignment, for example, butt-joint alignment, it is quite hard to place the laser diode apart from the ferrule in the optical module. Since the space between the laser diode and the ferrule in the conventional module is not sufficient to provide a lens therebetween, the coupling efficiency of the laser diode and the optical fiber is limited to about, at most, 10 dB. On the other hand, since an optical fiber in the present module 1 is aligned with the laser diode by the active alignment, it is possible to space the semiconductor light emitting element 14 apart from the ferrule 32 in the optical module 1. Since the space between the laser diode 14 and the ferrule 32 is sufficient to provide a lens therebetween, the coupling efficiency can be thereby enhanced.

Moreover, since the ferrule 32 is located apart from the laser diode 14 in the optical module 1, it is possible to provide the hermetic window 25 therebetween. The hermetic window 25 enables the hermetic sealing of the body 10, and the reliability of the laser diode 14 can be maintained over a long time.

The present invention is not limited to the above-described embodiments, and various modifications and changes can be considered.

Figure 8:
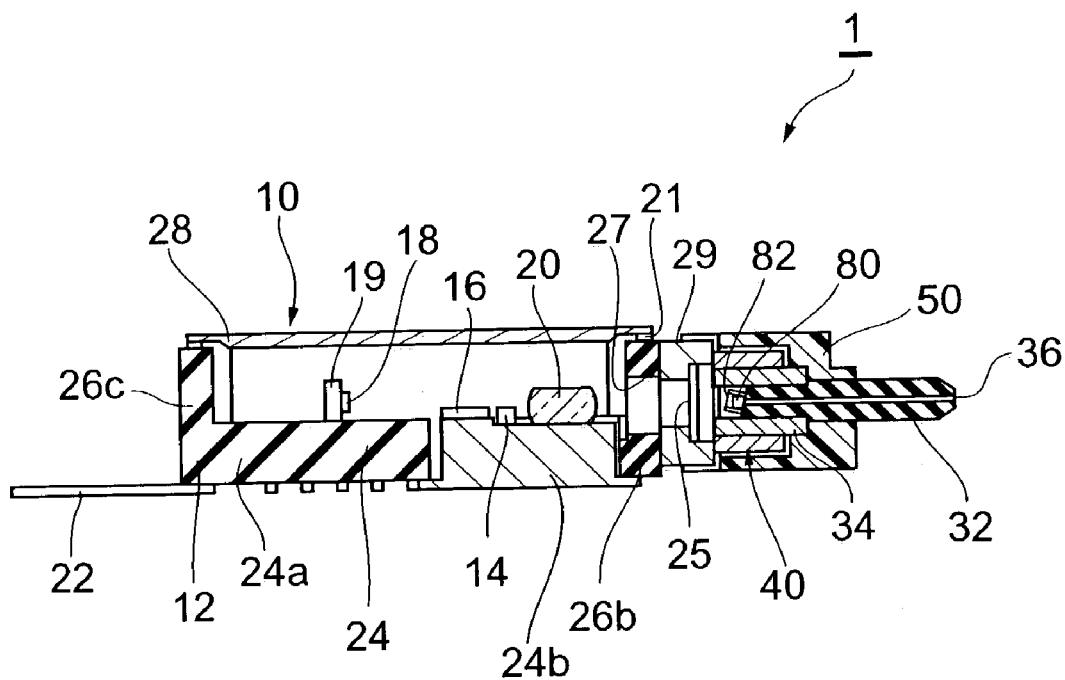
FIG. 8 is a cross sectional view showing a modified example of the optical module of the first embodiment.

FIG. 8 is a cross sectional view showing the optical module 1 which includes an optical isolator 80. The optical isolator 80 may be provided between the ferrule 32 of the optical component 30 and the laser diode 14. The optical isolator 80 is provided on an input end of the ferrule 32 and can be bonded to the ferrule 32. The optical isolator 80 can prevent light reflected in the optical fiber from returning back to the laser diode 14. Accordingly, it is possible to enhance the optical transmission characteristics in the speed of 10 gigabits per second (Gbps) or more.

If the positioning accuracy along the Z direction is tolerated, the holder 34 along the Z direction may be slid relative to the tubular portion 29 without using the sleeve 40 to position the holder 34 and the tubular portion 29 to each other in the X and the Y directions. The holder 34 may be welded to the tubular portion 29 directly.

Although the embodiment describes the light emitting module which includes the laser diode 14, the optical module may be a light receiving module which includes a light receiving device used as the optical element.

Figure 9A:
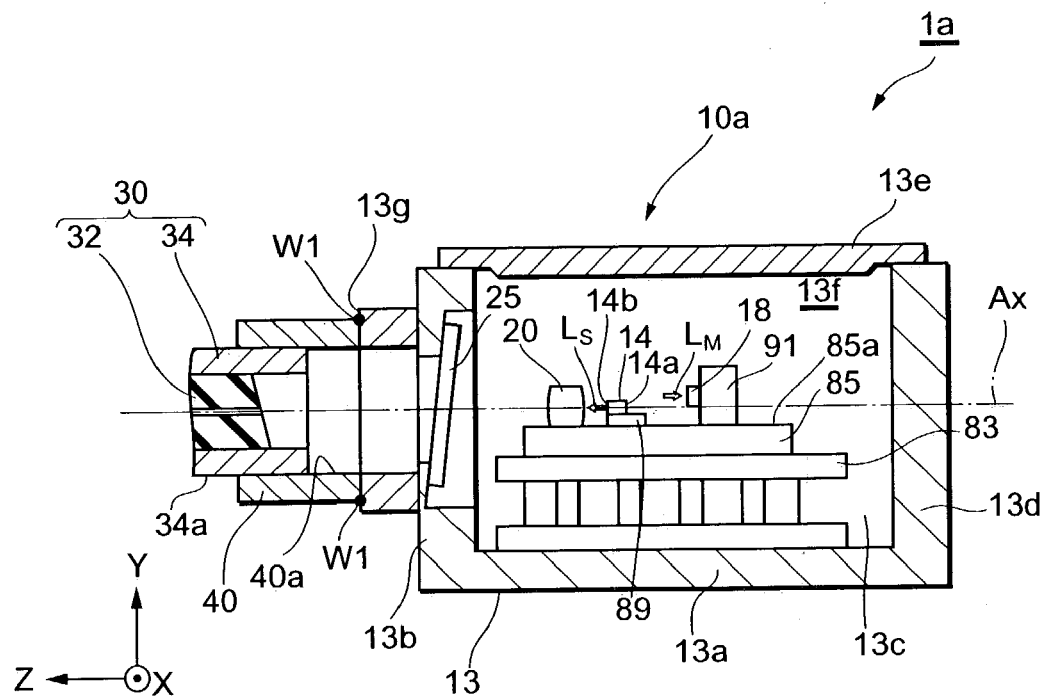
FIG. 9A is a cross sectional view showing another modified example of the optical module of the first embodiment.

FIG. 9A is a cross sectional view showing another modified example of the present embodiment. As shown in FIG. 9A, an optical module 1a includes a body 10a instead of the body 10 of the optical module 1. The body 10a includes the laser diode 14, the lens 20, a thermoelectric cooler 83, and a mounting member 85. The mounting member 85 is mounted on the thermoelectric cooler 83, such as a Peltier element. The lens 20 are provided on a mounting surface 85a of the mounting member 85. The laser diode 14 is mounted on a heat sink 89, and the heat sink 89 is mounted on the mounting surface 85a. The lens 20 and the laser diode 14 are optically aligned with each other on the mounting surface 85a. As the result of the optical alignment, light from the laser diode 14 is directed to the hermetic window 25, through the lens 20, and is output out through the window 25. The body 10a may include a temperature sensor, such as a thermistor.

The body 10a may include the photo diode 18 provided on the mounting surface 85a via a submount 91. The photo diode 18 is optically coupled with a rear facet 14a of the laser diode 14. The photo diode 18 monitors the light $L_M$ from the semiconductor light emitting element 14 and generates a photoelectric current in response to the light $L_M$. A front facet 14b of the laser diode 14 is optically coupled with the lens 20, and the light $L_S$ from the front facet 14b is incident to the lens 20.

The package 13 includes a bottom 13a, a front wall 13b, a side wall 13c, a rear wall 13d, and a lid 13e. In one example, the package 13 may be made of metal. In the package 13, the lid 13e is seam-welded to the front wall 13b, the side wall 13c, and the rear wall 13d to from a cavity 13f. The thermoelectric cooler 83 is provided on the bottom 13a. Heat from the thermoelectric cooler 83 is transmitted to the bottom 13a. In another example, the package 13 may be made of ceramic same as the package 12 shown in FIG. 1. Electronic elements, such as the laser diode 14, the photo diode 18, and the thermoelectric cooler 83 are electrically connected to lead terminals.

In the optical module 1a, an optical axis of the laser diode 14 extends along a direction of the Ax axis. In the body 10a, the photo diode 18, the laser diode 14, the lens 20, the hermetic window 25, and the sleeve 40 are arranged along the direction of the Ax axis. In the optical module 1a, the optical component 30 can be optically aligned with the body 10a by the sleeve 40. The optical module body 10a has a reference plane 13g which extends along a plane intersecting the Ax axis. The sleeve 40 is optically adjusted on the reference plane 13g in the X direction and the Y direction. The sleeve 40 maybe secured to a reference plane of the body 10a (equivalent to the reference plane 13g in this example) via welded portions W1. The optical component 30 is optically aligned along the Z direction by the sleeve 40. Since an outer surface 34a of the holder 34 extends along an inner surface 40a of the sleeve 40, the optical component 30 can move along the sleeve 40. By thus described alignment, the optical component 30 is optically coupled with the laser diode 14.

In the optical module 1a, the laser driver 16 is not provided within the package 13. The laser diode 14 receives a driving signal from a laser driver provided outside the package 13 via a lead terminal. However, it is possible to provide the laser driver inside the package.

Figure 9B:
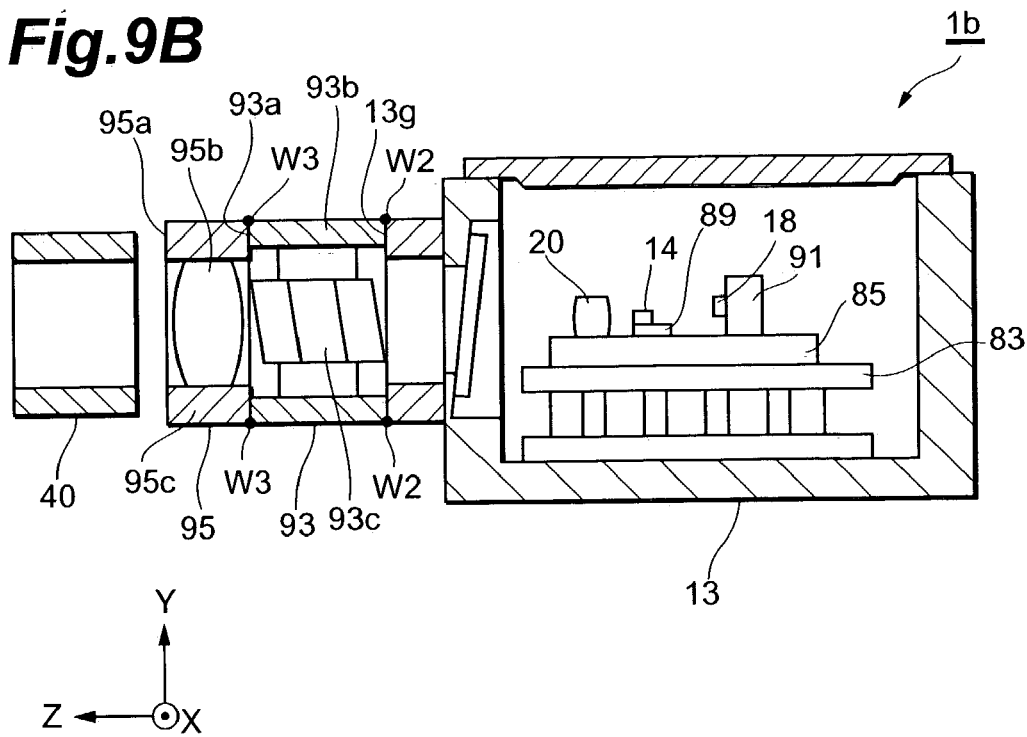
FIG. 9B is a cross sectional view showing still another modified example of the optical module of the first embodiment.

FIG. 9B is a cross sectional view showing still another modified example of the present embodiment. The optical module 1b may include at least any one of an optical isolator 93 and a lens component 95. The optical isolator 93 includes a reference plane 93a, a holder 93b, and an isolation unit 93c. The reference plane 93a extends along a plane intersecting the Ax axis. The lens component 95 includes a reference plane 95a, a lens 95b, and a holder 95c. The reference plane 95a extends along a plane intersecting the axis Ax. The holder 93b of the optical isolator 93 and the holder 95c of the lens component 95 are made of metal. The sleeve 40 is optically adjusted on the reference plane 95a to the body 10a in the X direction and the Y direction (this optical alignment will be hereinafter referred to as the "XY alignment"). The rotation angle of the optical isolator 93 is adjusted on the reference plane 13g about the optical axis. The adjusted optical isolator 93 is secured to the reference plane 13g via welded portions W2. The lens component 95 is secured to the reference plane 93a of the optical isolator 93 via welded portions W3. As described before, the optical component 30 is optically aligned in the Z-axis direction by use of the sleeve 40 (this optical alignment will be hereinafter referred to as the "Z alignment"). As a result of these optical alignments, the optical component 30 is optically coupled with the semiconductor light emitting element 14 via the optical isolator 93 and the lens 95.

Second Embodiment

FIG. 10 is a view showing components of an optical module according to the second embodiment. FIG. 11A is a view showing the optical module. FIG. 11B is a view showing a guide part included in the optical module.

As shown in FIG. 10 and FIG. 11A, an optical module 2 includes the body 10a, the optical component 30, the sleeve 40, the other sleeve 97, and a guide 99.

Referring to FIG. 11A, the sleeve 40 includes first and second portions 40b and 40c. The first and second portions 40b and 40c are arranged in the direction of the Ax axis. The holder 34 includes first and second portions 34b and 34c. The first and second portions 34b and 34c are arranged along the Ax axis. The second portion 34c of the holder 34 is located inside the first portion 40b of the sleeve 40. The end 34d of the holder 34 touches to a face 99c of the guide 99. The end 40d of the sleeve 40 has an end face 40e extending in a plane intersecting the Ax axis. The end 40d of the sleeve 40 faces to the body 10a.

It is possible to perform the XY alignment of the sleeve 40 on the reference plane to the body 10a (which is equivalent to any one of the reference planes 13g, 93a, and 95a shown in FIGS. 9A and 9B). For example, the optical component 30 is optically adjusted on the reference plane 95a by the end surface 40e of the sleeve 40. It is possible to perform the Z alignment by sliding the optical component 30 relative to the sleeve 40.

The guide 99 includes a side wall 99a and a hole 99b. The side wall 99a extends along the Ax axis. The hole 99b is provided such that the hole 99b can receive the ferrule 32 therein. The positioning face 99c extends along a plane intersecting the Ax axis. The holder 34 abuts on the face 99c of the guide 99.

Since the holder 34 abuts on the face 99c of the guide 99, the guide part 99 is positioned to the holder 34, which has been aligned to the optical axis of the optical fiber 37.

The side wall 99a of the guide 99 includes first to third portions 101a, 101b and 101c, and a step 101d. The first to third portions 101a, 101b and 101c are arranged in the direction of the Ax axis. The first portion 101a of the side wall 99a is provided such that the first portion 101a can receive therein a ferrule (numbered as reference numeral 79 shown in FIG. 6B, for example) of an optical connector (numbered as reference numeral 70 shown in FIG. 6B, for example) to be connected to the optical module 2. The third portion 101c of the side wall 99a includes an inner face 103 for guiding the holder 34. The positioning face 99c is provided at the step 101d of the hole 99b. The ferrule 32 and holder 34 of the optical component 30 are inserted into the hole 99b while the holder 34 is guided by the inner face 103. The optical component 30 can insert in the hole 99b until the holder 34 abuts on the face 99c. After abutting, the guide part 99 is adjusted with respect to the optical component 30. In a preferred example, the guide 99 may be made of metal. When the metallic guide 99 is used, the welding of the guide 99 the holder 34 of the optical component 30 at welded portions W6 can be performed.

There is an interval between the guide 99 and the sleeve 40, so that the guide 99 is easily welded to the holder 34, and the shape of the guide 99 can be designed independent of the shape of the sleeve 40.

In the present embodiment, the ferrule 32 is inserted into the other sleeve 97 after the XY-alignment of the sleeve 40 and the Z alignment of the optical component 30. The other sleeve 97 may be a split sleeve or a precision sleeve. After inserting the ferrule 32 to the other sleeve 97, the holder 34 is secured to the guide 99. This securing can be achieved by laser welding, resin adhesion, or press-fitting. Alternatively, after the ferrule 32 is inserted into the other sleeve 97 to form an assembly, this assembly can be optically aligned with the primary portion via the sleeve 40.

FIG. 12 is a view showing a modified example of the optical module of the present embodiment. As shown in FIG. 12, an optical module 2a may further include a receptacle 105. The guide 99 includes a protruding portion 99d provided on the outer surface of the side wall 99a. The receptacle 105 is attached to the protruding portion 99d of the guide 99. The receptacle 105 can be positioned to the guide 99 by abutting on the protruding portion 99d of the guide 99. The receptacle 105 includes a surface 105a on which the protruding portion 99d of the guide part 99 abuts, an hole 105b for receiving the guide part 99 therein, and elastic fingers 105c to be engaged with the optical connector.

In this example, the receptacle 105 may be a receptacle structure for an SC-type connector. However, the structure of the receptacle 105 is not limited thereto.

Third Embodiment

Figure 13:
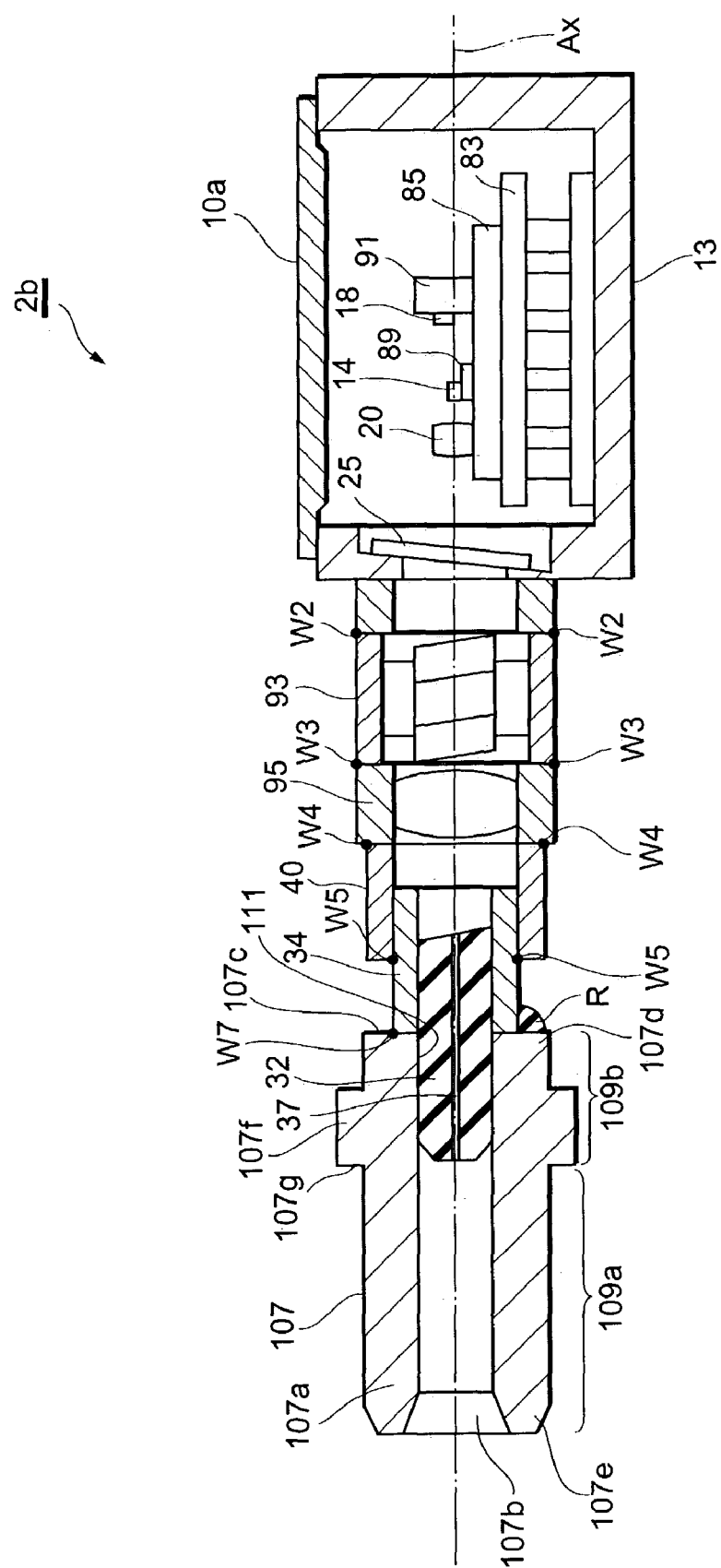
FIG. 13 is a view showing an optical module according to a third embodiment of the present invention.

FIG. 13 is a view showing components of an optical module according to the third embodiment. As shown in FIG. 13, an optical module 2b includes the body 10a, the optical component 30, the sleeve 40, and a guide part 107.

In the optical module 2b, the guide part 107 includes a side wall 107a, a hole 107b, and a face 107c. The side wall 107a extends in the direction of the axis Ax. The hole 107b is provided by the side wall 107a, and is provided such that the guide part 107 can receive the ferrule 32 therein. The face 107c extends along a plane intersecting the Ax axis. The ferrule 32 is inserted into the guide 107 until the holder 34 attaches the face 107c of the guide part 107.

In the optical module 2b, the holder 34 abuts on the face 107c, so that the guide 107 is positioned to the optical component 30.

The side wall 107a of the guide part 107 includes first and second portions 109a and 109b. The first and second portions 109a and 109b are arranged along the direction of the Ax axis. The first portion 109a is provided such that the first portion 109a can receive therein a ferrule 79 in FIG. 6B of an optical connector. The second portion 109b includes the inner side face 111 for guiding the holder 34. The ferrule 32 advances in the hole 107b while the ferrule 32 is guided by the inner side wall 111 of the guide part 107. The optical component 30 can advance until the holder 34 reaches the face 107c, so that the guide 107 is positioned to the optical component 30.

The guide part 107 includes a first end 107d and a second end 107e. The hole 107b extends from the first end 107d to the second end 107e. The face 107c is located at the first end 107d.

Since the first end 107d is apart from an end of the sleeve 40, it is easy to secure the guide 107 to the holder 34 and it is possible to design the shape of the guide 107 independent of the shape of the sleeve 40.

In the present invention, the guide 107 may be made of metal or ceramic. The metal or ceramic guide part 107 has an inner diameter with high precision, whereby the guide part 107 functions as a precision sleeve.

When the metallic guide 107 is used, the guide 107 is welded to the holder 34 at welded portions W7. When the ceramic guide 107 is used, the guide 107 is adhered to the holder 34 by an adhesion resin R.

As described above, in the present embodiment, the ferrule 32 of the optical component 30 is inserted into the guide part 107 after completion of the XY-alignment of the sleeve 40 and the Z-alignment of the optical component 30. Alternatively, it is possible to fit the holder 34 to the guide 107 prior to the XY-alignment of the sleeve 40 and the Z-alignment of the optical component 30.

Fourth Embodiment

FIGS. 14A, 14B, 15A, and 15B are views showing a process for manufacturing an optical module.

Figures 14A, 14B:
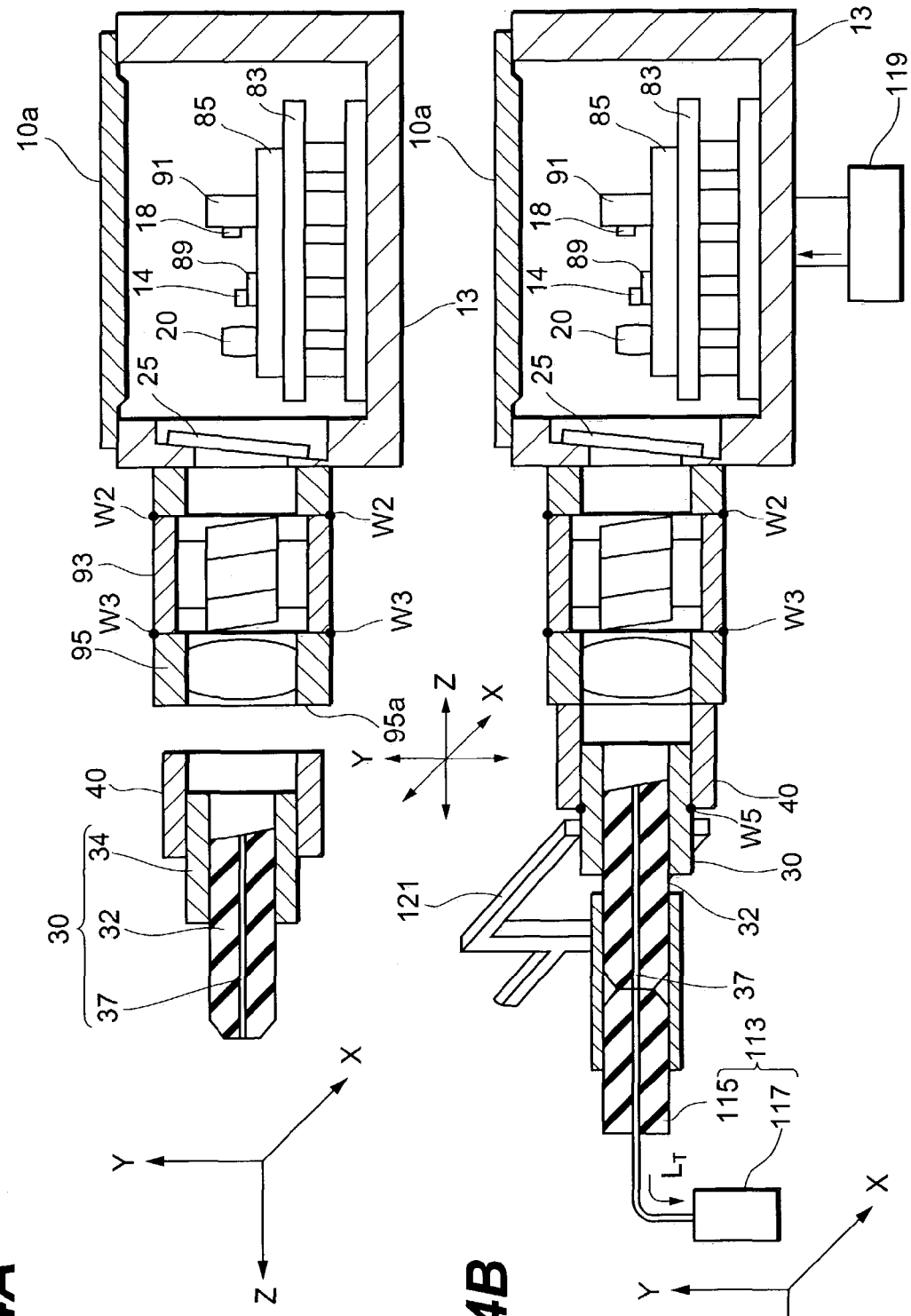
FIGS. 14A and 14B are views showing primary process steps for manufacturing an optical module.

The body 10a the optical component 30, and the sleeve 40 are prepared as shown in FIG. 14A. In the present embodiment, the body 10a includes the optical isolator 93 and the lens component 95. On the mounting surface 85a inside the package 13, the laser diode 14, the photo diode 18, and the lens 20 have been aligned with each other. The thermoelectric cooler 83, the laser diode 14, and the photo diode 18 are electrically connected to lead terminals.

As shown in FIG. 14B, an electrical power 119 is connected to the body 10a. The sleeve 40 and the optical component 30 are placed on the reference plane 95a. Part of the optical component 30 is located inside the sleeve 40. The sleeve 40 is held by an assembling tool 121, and is movable in the respective directions along the X, Y, and Z axes. The optical component 30 is optically coupled with an optical power meter 113. The optical power meter 113 includes an optical connector 115. Light $L_T$ from the laser diode 14 is measured by the optical power meter 113. The position of the sleeve 40 is adjusted on the reference plane 95a in the X direction and in the Y direction by the assembling tool 121. At a certain position of the sleeve 40, the optical power meter 113 outputs a signal with a maximum power. The assembling tool 121 holds the sleeve 40 at this position, and the sleeve 40 is secured to the reference plane 95a. In the present embodiment, the sleeve 40 is welded to the body 10a by laser welding at the welded portions W4.

Figures 15A, 15B:
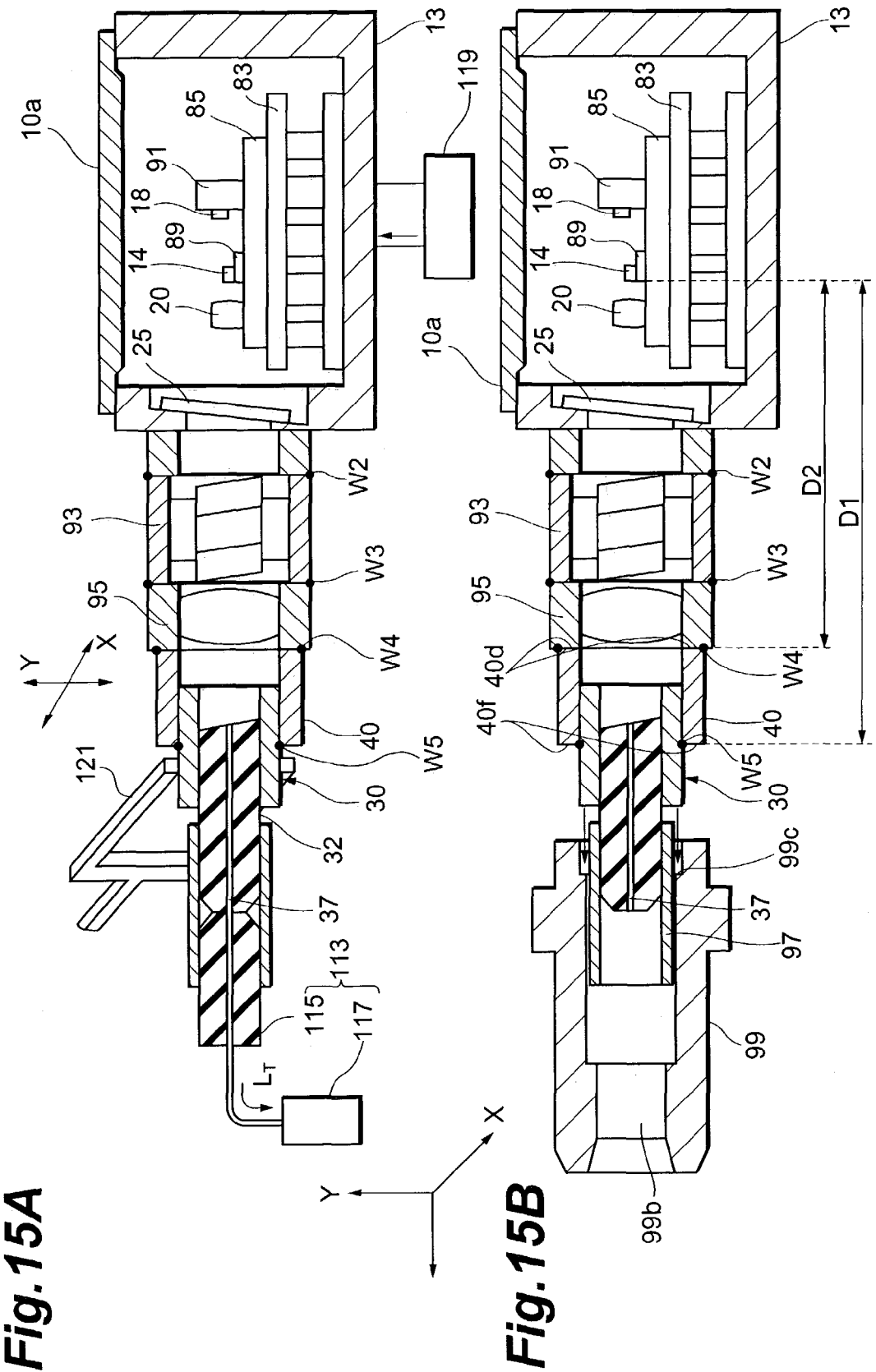
FIGS. 15A and 15B are views showing the primary process steps for manufacturing the optical module.

As shown in FIG. 15A, the light $L_T$ from the 14 is measured by the optical power meter 113. The position of the sleeve 40 is slid along the Z direction by use of the assembling tool 121. In a certain position, the optical power measurement tool 113 outputs a signal with a predetermined magnitude. In this position, the optical component 30 is fixed to the sleeve 40. In the present embodiment, the optical component 30 is welded to the sleeve 40 by laser welding at the welded portion W5.

In FIG. 15B, following the completion of optical alignment of the three axes, i.e., X, Y, and Z axes, the ferrule 32 is inserted into the other sleeve 97. Thereafter, the ferrule 32 is inserted into the hole 99b of the guide 99 until the holder 34 attaches to attach the face 99c of the guide 99. The holder 34 is fixed to the guide 99 after the holder 34 touches the face 99c.

Figure 16A:
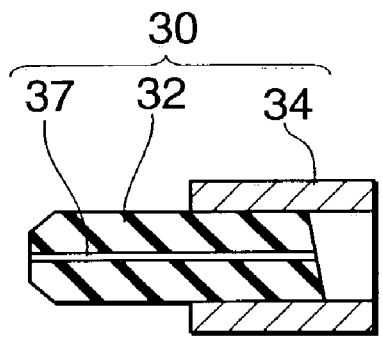
FIG. 16A is a view showing an optical component and a sleeve for the optical module.
Figure 16B:
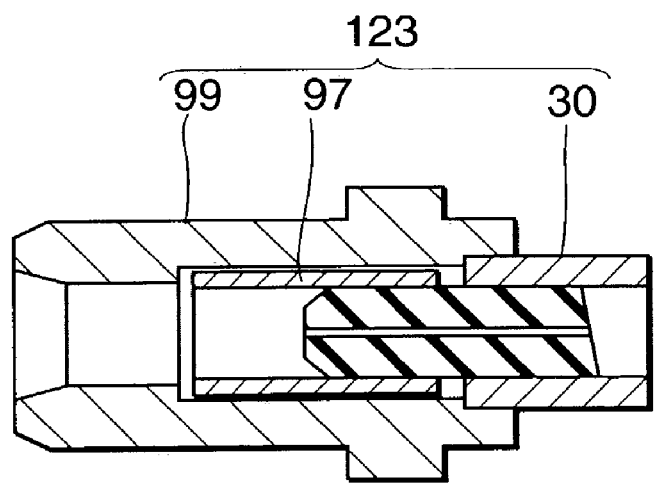
FIG. 16B is a view showing an assembly for the optical module.

In the present embodiment, the optical component 30 and the sleeve 40 are optically aligned with the body 10a. However, it is possible to use an assembly 123 shown in FIG. 16B instead of the optical component 30 and the sleeve 40 shown in FIG. 16A. The guide 99, the other sleeve 97, and the optical component 30 is combined with each other to form an assembly 123.

Description has been made on the optical module according to the embodiments of the present invention with reference to a number of examples. On the Ax axis, a distance between a position for the Z alignment (for example, welded portions W5 in FIG. 15A) and a semiconductor optical element, such as the laser diode, is greater than a distance between a position for the XY alignment (for example, welded portion W4 in FIG. 14B) and the semiconductor optical element.

Having described and illustrated the principle of the invention in a preferred embodiment thereof, it is appreciated by those having skill in the art that the invention can be modified in arrangement and detail without departing from such principles. The present invention shall not be limited to the specific examples disclosed in the specification. For example, the structures of the optical module and of the optical connector plug are not limited to the specific structures described in the embodiments. We therefore claim all modifications and variations coming within the spirit and scope of the following claims.

What is claimed is:

1. An optical module comprising:
a package mounting a laser diode therein, the package having a front wall;
an optical component including a ceramic ferrule and a tubular metallic holder, the ceramic ferrule having a first portion and a second portion, the tubular metallic holder securing the second portion of the ceramic ferrule;
a metallic sleeve for securing a part of the holder to position the holder relative to the package;
another sleeve for securing the first portion of the ceramic ferrule; and
a tubular metallic guide including first, second and third portions, the first and second portions covering the other sleeve, and the third portion securing a portion of the metallic holder, wherein
the metallic holder is welded to the metallic sleeve, the metallic sleeve is welded to the package, and the guide is welded to the metallic holder.

2. The optical module according to claim 1,
wherein the tubular metallic guide includes a hole for receiving the ceramic ferrule therein, the hole having an inner face with a step between the first and third portions thereof, the tubular metallic holder abutting on the step to secure a space between the tubular metallic holder and the tubular metallic guide.

3. The optical module according to claim 1, further comprising
a lens component provided between the ceramic ferrule and the laser diode, the lens component including a lens and a metallic holder for securing the lens therein, the metallic holder being welded to the metallic sleeve.

4. The optical module according to claim 1, further comprising
an optical isolator provided between the ceramic ferrule and the laser diode, the optical isolator including an isolation unit and a metallic holder for securing the isolation unit therein, the metallic holder being welded to the front wall of the package.

5. The optical module according to claim 4,
wherein the package further comprises a metallic tubular portion in the front wall thereof, the metallic holder of the optical isolator being welded to the tubular portion.

6. The optical module according to claim 1,
wherein the second portion of the ceramic ferrule has a diameter smaller than a diameter of the first portion to form a step between the first and second portions, the tubular metallic holder securing the second portion of the ceramic holder so as to abut on the step.

7. The optical module according to claim 1,
wherein the front wall of the package has a metallic tubular portion, the sleeve being welded to the tubular portion.

* * * * *